Patented Nov. 18, 1930

1,782,383

UNITED STATES PATENT OFFICE

HAROLD W. GREIDER, OF PLYMOUTH MEETING, PENNSYLVANIA, ASSIGNOR TO THE PHILIP CAREY MANUFACTURING COMPANY, A CORPORATION OF OHIO

HEAT-INSULATING MATERIAL AND PROCESS OF MANUFACTURE

No Drawing. Application filed February 19, 1926. Serial No. 89,494.

This invention relates to heat insulating materials and the process of manufacturing same. It is applicable particularly to insulations comprising light, bulky, finely-divided ingredients such as magnesia, used alone or mixed with a fibrous binder such as asbestos, or also comprising other fine-divided materials such as diatomaceous earth and calcium carbonate. It is applicable, for example, in the manufacture of 85% magnesia.

Heretofore, in making heat insulation material of the type referred to, finely-divided and/or fibrous ingredients have been made up with water into a semi-fluid or semi-plastic mix, air or other gas introduced into the mix prior to molding to make it lighter and more homogeneous, and the mix then forced into filter-molds expelling most of the water by the application of pressure of about 25 to 50 pounds per square inch while retaining the solids. When the molds are filled, the pumps are disconnected, the molds opened, and the molded forms removed and their dampness removed by drying. Insulation so made is, however, undesirably dense since the introduced air or other gas has been substantially expelled by the pressure and drainage of water from the molds and the solid materials have been compacted. Moreover shrinkage of the material during drying also makes the dried product undesirably dense.

According to my invention, the above process, and product resulting therefrom, may be largely improved by forming in the mix prior to molding a foam of minute emulsified bubbles of air or other gas having bubble films of such strength that they will successfully withstand compacting of the material during the molding and drying operations. The forming and stabilizing of a foam of minute emulsified gas bubbles of the requisite strength and minuteness of size according to my invention is accomplished by including in the water of the mix prior to molding substances which have the property of tending to form and stabilize bubble-films and which I therefore call film-forming and stabilizing agents. Since these substances produce bubbles in the form of an emulsion they may also be referred to as gas-emulsifying agents. The presence of a gas-emulsifying agent (film-forming and stabilizing agent) in the water of the mix causes air or other gas introduced or otherwise dispersed therein prior to molding to emulsify forming a gaseous emulsion which resists molding under pressure with drainage of water from filter-molds and which is retained in the molded forms. Since a multiplicity of the minute bubbles of emulsified gas are retained during the molding and drying operations, I am able to make a heat insulation which is exceedingly light and which contains in addition to the normal porosity of the mass a multiplicity of minute voids created by the drying of innumerable bubbles of the intermixed gaseous emulsion. A multiplicity of these minute voids, which may be referred to as dried bubbles of a gaseous emulsion, are of microscopic size and make the insulation product highly micro-porous. The fact that a multiplicity of the voids are of microscopic size permits them to give the product increased lightness without sacrifice of mechanical strength. Moreover since heat insulation efficiency is increased much more by very minute voids than by coarse voids, the heat insulation efficiency of the product is increased to much greater extent than if the voids were coarse. Also the resultant product is of markedly decreased density and cost per unit volume.

Those substances are most effective as film-forming and stabilizing agents, and gas-emulsifying agents, which have pronounced colloidal properties when dispersed in water though some substances which are soluble in water are also satisfactory film-forming and stabilizing agents. While the substances which I use according to my invention are not to be regarded as limited by any theory described as to their mode of action, those substances have been found to be particularly satisfactory in producing mechanically strong pressure-resisting bubble-films which facilitate the formation of bubble-films by reducing the surface tension of water, or by concentration effect of finely-divided particles of the substance at the interface between the water and the air of the bubbles, or both.

The following are substances which possess particularly satisfactory film-forming and stabilizing properties and which produce an intermixed gaseous emulsion of minute bubbles of required strength and stability according to my invention: Alkali metal salts (soaps) of fatty acids, either saturated or unsaturated, having sixteen or more carbon atoms in the molecule; sulphuric acid compounds of unsaturated fatty acid glycerides (sulphonated vegetable oils), having sixteen or more carbon atoms in the fatty acid radical; sulphonated unsaturated fatty acids, having sixteen or more carbon atoms in the molecule; alkali metal soaps of sulphonated unsaturated fatty acid glycerides (soaps of sulphonated vegetable oils), having sixteen or more carbon atoms in the fatty acid radical; alkali metal soaps of sulphonated unsaturated fatty acids, having sixteen or more carbon atoms in the molecule; saponin; alkali metal resinates (so-called rosin soaps). These materials may be used alone or a combination of two or more may be utilized to supplement each other in more effectively producing the result. These substances above mentioned are of such a nature that they not only create strong bubble-films and emulsify gas but also possess to a greater or less extent the property of carrying into and holding in or on the films of shells of the bubbles sufficient of the particles of the solid materials to counteract the tendency of the bubbles to rise or float on the top of the mix. Moreover, the particles of finely-divided solids thus held in the bubble-films impart additional strength and stability to the bubbles making them what I call armor-plated bubbles and help to prevent the bubbles thus armor-plated from being expelled from a semi-fluid mix containing them as an intermixed foam when the mix is forced into molds under pressure with drainage of water from the molds. Substances which are particularly effective in producing a foam of what I have called armor-plated bubbles because of their strength and stability and tendency to not rise to the surface in an aqueous mix, and are therefore preferable for use according to my invention, are sulphonated vegetable and animal oils, soaps of sulphonated oils, and sodium resinate.

The quantity of the agent which may be used is dependent upon several factors, such as the micro-porosity required (the voids in the product can be increased by using a greater quantity of the agent or decreased by a reduction of same) and the grade of asbestos fiber used (where heavy coarse grades of asbestos are used an increased quantity of agent should preferably be used). Where, also, a mix contains as impurities metallic salts such as soluble salts of calcium, magnesium, aluminum, iron, barium, zinc, etc., in solution which would react with the film-forming stabilizing agent to form an insoluble precipitate or coagulum, so that the agent would not be soluble or readily capable of colloidal dispersion in the mixture, it is necessary to increase the proportion of the agent to offset the result stated and to insure there being sufficient of the agent present in an effective condition to obtain the result desired.

Film-forming and stabilizing agents are used according to my invention preferably by incorporating them in the mix prior to molding and then introducing air or other gas as by mechanical agitation, chemical reaction, and the like, to form a foam of minute emulsified bubbles having films of the strength and stability above referred to. It is preferable according to my invention to inject or introduce the agent after it has previously been dissolved or colloidally dispersed in hot water while the mix to which it is introduced is in a mixing tank. It may, however, be introduced if desired at any other point in the process provided an intermixed foam of emulsified gas bubbles stabilized thereby is produced in the mix prior to molding. It is possible also to form a gaseous emulsion created and stabilized by a film-forming and stabilizing agent and then commingle the emulsion with the mix prior to molding. The agent is preferably introduced into the mixture while the mixture is hot, namely, above normal temperature, as the effectiveness of the agent is increased by warming the mix.

The use of heavy, coarsely-crystalline, non-porous materials, such as cement and plaster of Paris, which set by chemical reaction, is not preferable in connection with the employment of my invention though their use is not necessarily inconsistent with my invention where they are used in a semi-fluid mix and the mix is molded under pressure with drainage of water from the molds before substantial setting of the materials by chemical reaction. Moreover, it is preferable to employ a mix containing such an excess of water that setting of the mix by chemical reaction would be impossible even though a limited amount of a substance such as cement or plaster of Paris were present. A mix containing water to the extent of nine times the weight of solids in the mix is preferable in the employment of my invention.

By way of illustration, I will now describe my invention as embodied in the process, and product resulting therefrom, of manufacturing the magnesia-asbestos insulating material commonly known as 85% magnesia.

According to my invention, the process heretofore used in making 85% magnesia may be modified and improved by including in a semi-fluid mix comprising magnesia and asbestos prior to molding a film-forming and stabilizing agent (gas-emulsifying agent) such as the sodium soap of sulphonated castor oil, for example, in the proportions of about two pounds to a mix containing 2000 pounds of magnesia by dry weight (about one-tenth of one per cent.) and then mechanically agitating the mix to form an intermixed emulsion of air introduced by the agitation. Upon molding under pressure of about 25 to 50 pounds per square inch in the usual way in filter-molds with drainage of water, the emulsion will resist the pressure of molding and the resultant molded forms of 85% magnesia will contain a multiplicity of thickly interspersed minute voids in excess of those which would occur were my invention not employed. While pressures of about 25 to 50 pounds per square inch expel some of the larger bubbles of the foam together with the greater quantity of the water, the pressure is not sufficient to break down and expel the innumerable minute stable emulsified bubbles. The use of lower pressures than those before stated as preferable permits the retention of large bubbles, but, although this permits the making of insulation of lighter weight, it results in an insulation which, because of the presence of the large bubbles, is mechanically weaker in a wet state, more difficult to handle, and structurally weaker when dry. After 85% magnesia so made has been molded and subjected to the necessary drying treatment to remove the remaining water, the drying treatment causes the films of the minute bubbles to break down but, although they may change form, they still remain in the structure as dried bubbles of a gaseous emulsion forming innumerable irregular shaped minute cells or voids. Since only a very small quantity of gas-emulsifying agent is required, the cost of employing a gas-emulsifying agent is practically negligible.

If an insulating cement is the product desired instead of molded forms, it may be produced by grinding dried product above described to the desired fineness.

While I have illustrated my invention in detail as applied to the manufacture of 85% insulation and have otherwise set forth specific illustrations in describing my invention, I desire to have it understood that said specific illustrations do not limit the true scope of my invention.

1. Light, highly micro-porous heat insulation material comprising finely-divided solids and a multiplicity of minute voids, molded under pressure with expulsion of water in filter-molds from a semi-fluid mix containing a foam of minute mechanically strong pressure-resisting bubbles of emulsified gas having films stabilized by a film-forming and stabilizing agent and armor-plated by finely-divided solid ingredients held in said films by said film-forming and stabilizing agent.

2. Heat insulation material molded under pressure with expulsion of water in filter-molds from a semi-fluid water mix before substantial setting of the ingredients of the mix by chemical reaction, comprising finely-divided solid ingredients thickly interspersed with minute dried bubbles of a gaseous emulsion, the material surrounding the multiplicity of voids created in said insulation by said dried bubbles containing minute quantities of a film-forming and stabilizing agent.

3. 85% magnesia molded under a pressure of from twenty-five to fifty pounds per square inch with expulsion of water in filter-molds from a semi-fluid water mix containing magnesia and asbestos fiber with an amount of water in excess of that which would permit setting of the mix without application of pressure, comprising finely-divided magnesia and asbestos fiber thickly interspersed with minute dried bubbles of a gaseous emulsion, the material surrounding the multiplicity of minute voids created in said insulation by the drying of said bubbles containing a minute quantity of sodium soap of sulphonated castor oil.

4. Heat insulation material molded under pressure with expulsion of water in filter-molds from a semi-fluid water mix before substantial setting of the ingredients of the mix by chemical reaction, comprising finely-divided solid ingredients including fiber, thickly interspersed with minute dried bubbles of a gaseous emulsion, the material surrounding the multiplicity of voids created in said insulation by said dried bubbles containing minute quantities of a film-forming and stabilizing agent.

5. Heat insulation material molded under pressure with expulsion of water in filter-molds from a semi-fluid water mix before substantial setting of the ingredients of the mix by chemical reaction, comprising finely-divided solid ingredients including magnesia, thickly interspersed with minute dried bubbles of a gaseous emulsion, the material surrounding the multiplicity of voids created in said insulation by said dried bubbles containing minute quantities of a film-forming and stabilizing agent.

6. Heat insulation material molded under pressure with expulsion of water in filter-molds from a semi-fluid water mix before substantial setting of the ingredients of the mix by chemical reaction, comprising finely-divided magnesia and asbestos fiber, thickly interspersed with minute dried bubbles of a gaseous emulsion, the material surrounding the multiplicity of voids created in said insulation by said dried bubbles containing minute quantities of a film-forming and stabilizing agent.

7. In a process of making heat insulation material wherein finely-divided solid ingredients are mixed with water to form a semi-fluid mix, air or other gas being introduced in water of the mix prior to molding the mix, the mix is molded in filter-molds under pressure with expulsion of water, and the molded forms are thereafter dried, the step comprising including in water of the mix a gas-emulsifying agent and emulsifying said gas when introduced in said water of the mix so as to form a stable gaseous emulsion of minute pressure-resisting bubbles in said mix prior to molding said mix, a multiplicity of said bubbles of emulsified gas being substantially retained during said molding under pressure in filter-molds and a multiplicity of thickly interspersed minute voids being created in the dried product by said retained bubbles of said gaseous emulsion.

8. In a process of making heat insulation material wherein finely-divided solid ingredients are mixed with water to form a semi-fluid mix, air or other gas is introduced into the mix prior to molding, the mix is molded in filter-molds under pressure of about 25 to 50 pounds per square inch with expulsion of water and the molded forms are thereafter dried, the steps comprising including in water of the mix a gas-emulsifying agent and emulsifying said gas when introduced in said mix so as to form a stable gaseous emulsion of minute pressure-resisting bubbles in said mix prior to molding, and thereby retaining a multiplicity of said bubbles of emulsified gas during said molding of said mix under pressure in filter-molds so as to form a multiplicity of thickly interspersed minute dried bubbles of a gaseous emulsion in the dried product.

9. In a process of making heat insulation material wherein finely-divided solid ingredients are mixed with water to form a semi-fluid mix, air or other gas being introduced into water of the mix prior to molding the mix, the mix is molded in filter-molds under pressure of about 25 to 50 pounds per square inch with expulsion of water before substantial setting of the materials of the mix by chemical reaction and the molded forms are thereafter dried, the steps comprising including in water of the mix a gas-emulsifying agent, and forming in the mix prior to molding a stable emulsion of said introduced gas containing a multiplicity of minute bubbles having strong pressure-resisting films formed and stabilized by said gas emulsifying agent and thereby retaining a multiplicity of said bubbles of emulsified gas during said molding of said mix under pressure in filter-molds and during drying so as to form a multiplicity of thickly interspersed minute dried bubbles of a gaseous emulsion in the dried product.

10. In a process of making heat insulation material wherein finely-divided inorganic ingredients including magnesia and fiber are mixed with water to form a semi-fluid mix, air or other gas being introduced into water of the mix prior to molding the mix, the mix is molded in filter-molds under a pressure of about 25 to 50 pounds per square inch with expulsion of water and the molded forms are thereafter dried, the steps comprising including in water of said mix comprising magnesia and fiber a gas-emulsifying agent, and forming in the mix prior to molding an emulsion containing a multiplicity of microscopic pressure-resisting bubbles of said introduced gas having strong films formed and stabilized by said gas emulsifying agent and armor plated by finely-divided solid ingredients held in said films by said gas-emulsifying agent, a multiplicity of said bubbles of emulsified introduced gas being substantially retained during said molding under pressure in the filter-molds and a multiplicity of thickly interspersed microscopic voids being created in the dried product by said retained bubbles of said gaseous emulsion.

11. In a process of making heat insulation material wherein finely-divided solid ingredients are mixed with water to form a semi-fluid mix, air or other gas being introduced in water of the mix prior to molding the mix, the mix is molded in filter-molds under pressure with expulsion of water, and the molded forms are thereafter dried, the step comprising including in water of the mix a gas-emulsifying agent comprising a sulphonated oil and emulsifying said gas when introduced in said water of the mix so as to form a stable gaseous emulsion of minute pressure-resisting bubbles in said mix prior to molding said mix, a multiplicity of said bubbles of emulsified gas being substantially retained during said molding under pressure in filter-molds and a multiplicity of thickly interspersed minute voids being created in the dried product by said retained bubbles of said gaseous emulsion.

12. In a process of making heat insulation material wherein finely-divided solid ingredients are mixed with water to form a semi-fluid mix, air or other gas being introduced in water of the mix prior to molding the mix, the mix is molded in filter-molds under pressure with expulsion of water, and the molded forms are thereafter dried, the step comprising including in water of the mix a gas-emulsifying agent comprising an alkali metal soap of sulphonated oil and emulsifying said gas when introduced in said water of the mix so as to form a stable gaseous emulsion of minute pressure-resisting bubbles in said mix prior to molding said mix, a multiplicity of said bubbles of emulsified gas being substantially retained during said molding under pressure in filter-molds and a multiplicity of thickly interspersed minute voids being created in the dried product by said retained bubbles of said gaseous emulsion.

13. In a process of making heat insulation material wherein finely-divided solid ingredients are mixed with water to form a semi-fluid mix air or other gas being introduced in water of the mix prior to molding the mix, the mix is molded in filter-molds under pressure with expulsion of water, and the molded forms are thereafter dried, the step comprising including in water of the mix a gas-emulsifying agent comprising an alkali metal resinate and emulsifying said gas when introduced in said water of the mix so as to form a stable gaseous emulsion of minute pressure-resisting bubbles in said mix prior to molding said mix, a multiplicity of said bubbles of emulsified gas being substantially retained during said molding under pressure in filter-molds and a multiplicity of thickly interspersed minute voids being created in the dried product by said retained bubbles of said gaseous emulsion.

14. Heat insulation material molded under pressure with expulsion of water in filter-molds from a semi-fluid water mix before substantial setting of the ingredients of the mix by chemical reaction, comprising finely-divided solid ingredients thickly interspersed with minute dried bubbles of a gaseous emulsion, the material surrounding the multiplicity of voids created in said insulation by said dried bubbles containing minute quantities of a film-forming and stabilizing agent comprising sulphonated oil.

15. Heat insulation material molded under pressure with expulsion of water in filter-molds from a semi-fluid water mix before substantial setting of the ingredients of the mix by chemical reaction, comprising finely-divided solid ingredients thickly interspersed with minute dried bubbles of a gaseous emulsion, the material surrounding the multiplicity of voids created in said insulation by said dried bubbles containing minute quantities of a film-forming and stabilizing agent comprising alkali metal soap of sulphonated oil.

16. Heat insulation material molded under pressure with expulsion of water in filter-molds from a semi-fluid water mix before substantial setting of the ingredients of the mix by chemical reaction, comprising finely-divided solid ingredients thickly interspersed with minute dried bubbles of a gaseous emulsion, the material surrounding the multiplicity of voids created in said insulation by said dried bubbles containing minute quantities of a film-forming and stabilizing agent comprising alkali metal resinate.

In testimony whereof, I have signed my name to this specification.

HAROLD W. GREIDER.